(12) United States Patent
Johnson et al.

(10) Patent No.: US 9,908,123 B2
(45) Date of Patent: Mar. 6, 2018

(54) METHOD AND SYSTEM FOR STACKING AND SEALING HYDRODYNAMIC SEPARATION LAYERS

(71) Applicant: Palo Alto Research Center Incorporated, Palo Alto, CA (US)

(72) Inventors: David Mathew Johnson, San Francisco, CA (US); Ashutosh Kole, San Francisco, CA (US); Kai Melde, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 204 days.

(21) Appl. No.: 13/839,146

(22) Filed: Mar. 15, 2013

(65) Prior Publication Data

US 2014/0262973 A1    Sep. 18, 2014

(51) Int. Cl.
| | | |
|---|---|---|
| *B03B 5/00* | (2006.01) |
| *B01D 63/08* | (2006.01) |
| *B03B 5/62* | (2006.01) |
| *B03B 5/32* | (2006.01) |
| *B01D 21/00* | (2006.01) |
| *B01D 21/26* | (2006.01) |

(52) U.S. Cl.
CPC ............ *B03B 5/00* (2013.01); *B01D 21/0003* (2013.01); *B01D 21/265* (2013.01); *B01D 63/082* (2013.01); *B03B 5/32* (2013.01); *B03B 5/62* (2013.01); *Y10T 29/49876* (2015.01)

(58) Field of Classification Search
CPC .... B03B 5/00; B03B 5/32; B03B 5/52; B03B 5/62; B01D 63/081; B01D 63/082; B01D 63/084

USPC ............ 209/3, 17, 538, 539, 540, 550, 906; 210/321.72, 321.75, 321.76
See application file for complete search history.

(56) References Cited

U.S. PATENT DOCUMENTS

| | | | | |
|---|---|---|---|---|
| 2,364,366 A | * | 12/1944 | Jahreis ................. | B01D 25/215 210/229 |
| 3,398,834 A | * | 8/1968 | Nuttall ................... | B01D 61/08 210/321.84 |
| 3,585,131 A | * | 6/1971 | Esmond ................... | 210/321.77 |

(Continued)

FOREIGN PATENT DOCUMENTS

| | | |
|---|---|---|
| CA | 2311747 | 12/2000 |
| EP | 1 407 807 A1 | 4/2004 |
| JP | 2004-330008 A | 11/2004 |

OTHER PUBLICATIONS

Ookawara et al., "Applicability of a Miniaturized Micro-Separator/Classifier to Oil-Water Separation," Chem. Eng. Technol. 2007, 30, No. 3, 316-321, 2007.

*Primary Examiner* — Joseph C Rodriguez
(74) *Attorney, Agent, or Firm* — Fay Sharpe LLP

(57) ABSTRACT

An assembly for a high output hydrodynamic separation unit includes, in one form, several components or parts. Top and bottom plates serve as caps for and distribute force through layers of separation channels. The compressive forces seal the channels and prevent leakage from the channels. An optional middle plate may also be provided to create smaller subsets of the layers of separation channels. At least one connector is provided to the combination of components to compress the layers of separation channels. In a variation, an optional outer shell may encase the unit to provide support and compress the stack with a unique threaded configuration.

10 Claims, 5 Drawing Sheets

(56) References Cited

U.S. PATENT DOCUMENTS

| | | | | |
|---|---|---|---|---|
| 3,695,444 A * | 10/1972 | Laconelli | A23F 5/285 | |
| | | | 210/321.75 | |
| 3,948,771 A | 4/1976 | Bielefeldt | | |
| 4,025,425 A * | 5/1977 | Croopnick | B01D 63/084 | |
| | | | 210/321.68 | |
| 4,340,475 A * | 7/1982 | Kraus | B01D 63/082 | |
| | | | 210/232 | |
| 4,460,391 A | 7/1984 | Muller et al. | | |
| 5,240,605 A * | 8/1993 | Winzeler | B01D 63/082 | |
| | | | 210/228 | |
| 5,248,421 A | 9/1993 | Robertson | | |
| 5,342,517 A * | 8/1994 | Kopf | B01D 25/215 | |
| | | | 210/228 | |
| 5,690,763 A * | 11/1997 | Ashmead | B01F 5/0604 | |
| | | | 156/252 | |
| 5,925,247 A * | 7/1999 | Huebbel | B01D 63/084 | |
| | | | 210/231 | |
| 6,569,323 B1 | 5/2003 | Pribytkov | | |
| 7,094,346 B2 * | 8/2006 | Osenar | B01D 63/081 | |
| | | | 156/356 | |
| 7,828,973 B2 * | 11/2010 | Connors, Jr. | B01D 63/081 | |
| | | | 210/321.75 | |
| 8,317,992 B2 * | 11/2012 | Sparrow | B01D 61/368 | |
| | | | 204/522 | |
| 8,647,479 B2 * | 2/2014 | Lean | C02F 9/00 | |
| | | | 204/242 | |
| 9,427,700 B2 * | 8/2016 | Park | C01B 3/503 | |
| 9,486,812 B2 * | 11/2016 | Lean | B03B 5/32 | |
| 2005/0242040 A1 * | 11/2005 | Ito | B01D 15/1807 | |
| | | | 210/658 | |
| 2008/0128331 A1 | 6/2008 | Lean et al. | | |
| 2009/0114607 A1 | 5/2009 | Lean et al. | | |
| 2009/0283455 A1 * | 11/2009 | Lean | B03B 5/32 | |
| | | | 209/555 | |
| 2012/0152855 A1 * | 6/2012 | Lean | B01D 21/0087 | |
| | | | 210/747.5 | |
| 2013/0196375 A1 * | 8/2013 | Strobbe | C12M 23/34 | |
| | | | 435/69.4 | |

\* cited by examiner

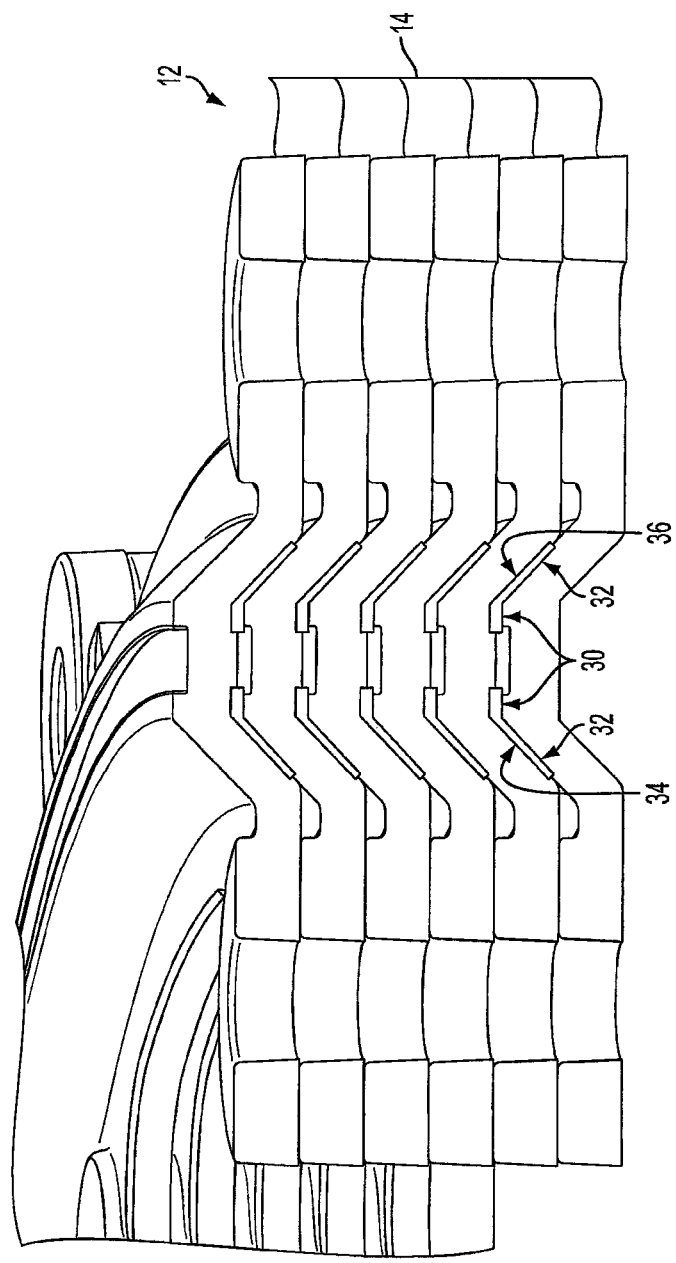

METHOD AND SYSTEM FOR STACKING AND SEALING HYDRODYNAMIC SEPARATION LAYERS

BACKGROUND

Various configurations of hydrodynamic separation devices have evolved over time. It has become desirable to produce such systems in a high volume, cost effective manner. In this regard, a commensurate technique for fabricating and sealing these devices is desired.

BRIEF DESCRIPTION

In one aspect of the presently described embodiments, a hydrodynamic separation device comprises a plurality of layers in a stack, each layer having defined therein a flow channel, an inlet to the flow channel, at least two outlets for the flow channel, and apertures defined in the layer, a first plate positioned on a first end of the stack, the first plate having apertures, a second plate positioned on a second end of the stack, the second plate having apertures and connectors received in aligned apertures of the stack, the first plate and the second plate to compress together the first plate, stack and second plate.

In another aspect of the presently described embodiments, each layer further includes alignment protrusions extending therefrom.

In another aspect of the presently described embodiments, the protrusions have shoulders disposed thereon.

In another aspect of the presently described embodiments, each layer further includes a highly polished sealing surface in proximity to the flow channel.

In another aspect of the presently described embodiments, each layer further includes a secondary sealing surface in proximity to the highly polished sealing surface.

In another aspect of the presently described embodiments, each layer of the stack is formed of a plastic material.

In another aspect of the presently described embodiments, the plastic material is a melt processes polymer, appropriate for the end application.

In another aspect of the presently described embodiments, the first plate and the second plate are formed of metal or plastic material.

In another aspect of the presently described embodiments, a hydrodynamic separation device comprises a plurality of layers in a stack, each layer having defined therein a flow channel, an inlet to the flow channel, and at least two outlets for the flow channel, a cylindrical shell housing the stack, the shell having a first threaded portion and a second threaded portion, a first plate threaded on the first threaded portion of the shell and a second plate threaded on the second threaded portion of the shell, wherein the plurality of layers in the stack are compressed between the first plate and the second plate.

In another aspect of the presently described embodiments, each layer further includes alignment protrusions extending therefrom.

In another aspect of the presently described embodiments, the protrusions have shoulders disposed thereon.

In another aspect of the presently described embodiments, each layer further includes a highly polished sealing surface in proximity to the flow channel.

In another aspect of the presently described embodiments, each layer further includes a secondary sealing surface in proximity to the highly polished sealing surface.

In another aspect of the presently described embodiments, each layer of the stack is formed of a plastic material.

In another aspect of the presently described embodiments, the plastic material is a melt processed polymer appropriate for the end application.

In another aspect of the presently described embodiments, the first plate and the second plate are formed of metal or plastic material.

In another aspect of the presently described embodiments, a method for forming a hydrodynamic separation device having a plurality of layers in a stack, each layer having defined therein a flow channel, an inlet to the flow channel, at least two outlets for the flow channel and protrusions extending from the layers, comprises aligning the protrusions of adjacent layers with one another, snapping together the layers into the stack such that protrusions of adjacent layers are mated and compressing the layers between two plates.

In another aspect of the presently described embodiments, the compressing comprises using connectors received in aligned apertures of the layers of the stack and the plates.

In another aspect of the presently described embodiments, the compressing comprises threading the plates into a cylindrical shell housing the stack.

In another aspect of the presently described embodiments, the snapping is accomplished by shoulders disposed on the protrusions extending from each layer.

DETAILED DESCRIPTION

According to the presently described embodiments, an assembly of a high output hydrodynamic separation device or unit includes, in one form, several components or parts. In this regard, top and bottom plates serve as caps for, and distribute force through, layers of separation channels. An optional middle plate may also be provided to create smaller subsets of the layers of separation channels. A connector or connecting system such as a series of connectors, e.g. through-bolts, is used in the combination of components to compress, and effectively seal, the layers of separation channels. In a variation of the design, an optional outer shell may encase the unit to provide support and compress the stack with a unique threaded configuration.

Figure 1:
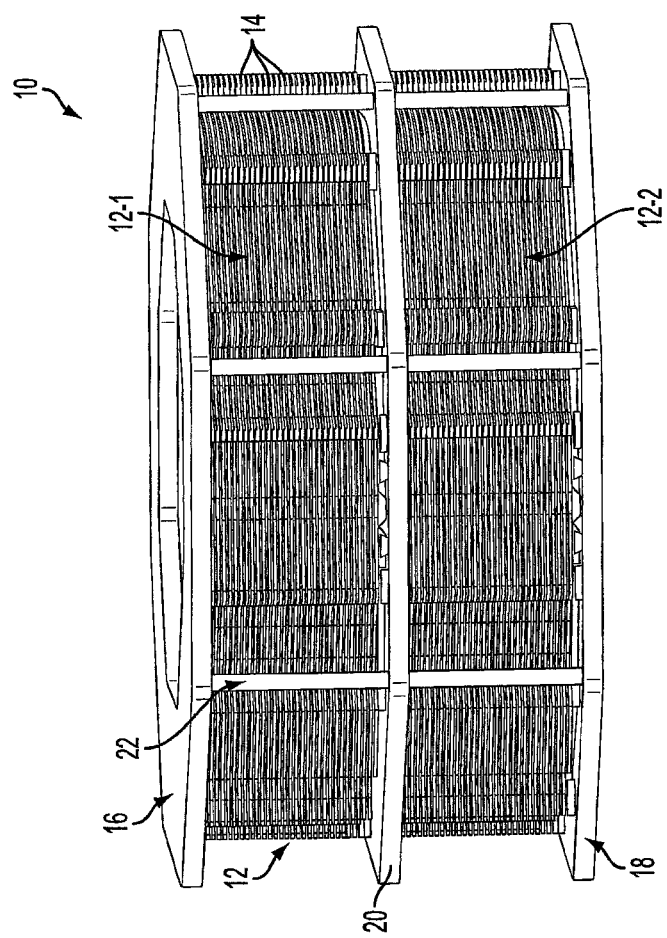
FIG. 1 is an elevational view of a hydrodynamic separation unit according to the presently described embodiments.

With reference to FIG. 1, a unit 10 according to the presently described embodiments is illustrated. As shown, a sub-stack 12-1 of individual layers, such as those shown at 14, is compressed by top plate 16 and middle plate 20, another sub-stack 12-2 of layers of similar configurations to those numbered 14 is shown compressed by middle plate 20 and bottom plate 18. The middle plate 20 is optional. In the absence of the middle plate 20, both sub-stack 12-1 and 12-2 are compressed between top plate 16 and bottom plate 18. Also shown are at least one connector or connecting system such as connectors, e.g. through-bolts 22. The connectors or through-bolts 22 connect through the plates 16, 18 and 20 to compress the layers 14 in the stack 12. In this regard, the plates 16, 18 and 20 have an appropriate number (e.g. at least one) of apertures or through holes—that can be aligned to receive the bolts 22. In one form, these apertures or through holes may be threaded to allow threaded bolts to provide compression force on the stack 12. Or, in another form, the apertures or through holes may be configured to allow the heads of the bolts, and corresponding nuts threaded on an opposite end, to generate and maintain the requisite compression force. The through-bolts 22 may also be inserted through the layers 14 in some configurations.

Figure 3:
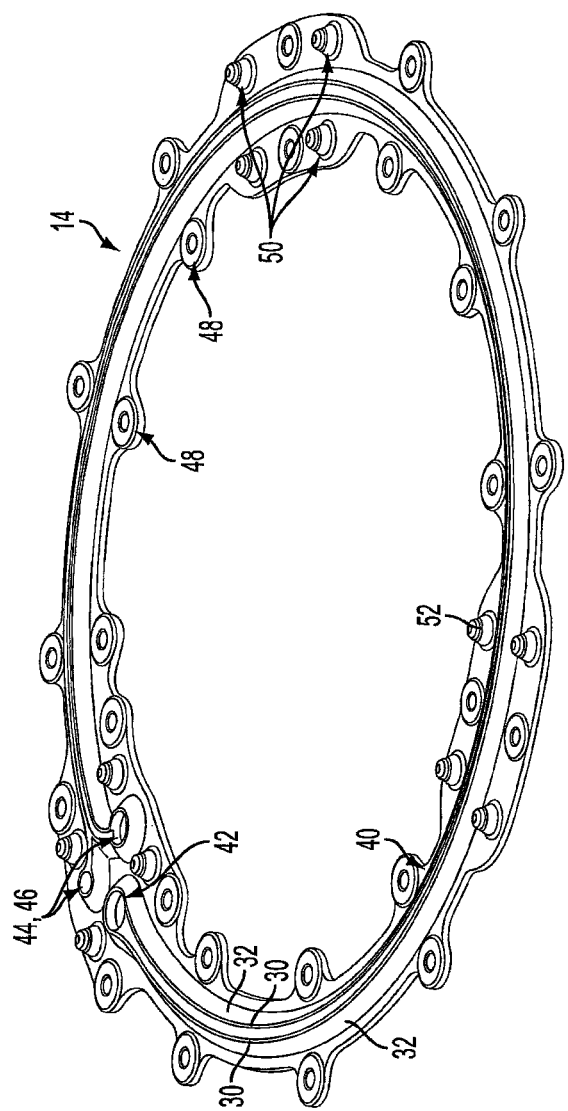
FIG. 3 is an elevational view of a layer of the hydrodynamic separation unit of FIG. 1; and, FIG. 4 is an elevational view of another hydrodynamic separation unit according to the presently described embodiments

Although it should be understood that the layers 14 may take any number of configurations, one example of a layer having through holes or apertures to accommodate this configuration is shown in FIG. 3 below. The layers 14 are, in at least one form, produced using injection molding techniques, and may be formed of any suitable material including materials that are, for example, processed by way of melting. Such materials may include plastic materials such as polycarbonates, polyesters, polypropylenes . . . etc.

The layers 14 are, in another form, produced by thermoforming techniques, and may be formed of any suitable material including materials that are processable by thermoforming techniques. Such materials may include polyesthers, polypropylenes and polyethylenes.

The layers 14 are, in another form, produced by either sand casting or high pressure die casting of a metal material such as aluminum, steel, stainless steel, titanium, magnesium or another appropriate metal material.

The layers 14 are, in another form, produced by any of the above techniques or others, and then a high quality surface finish is produced by the process of machining and removal of material.

Likewise, the plates (16, 18 and 20) may take on a variety of suitable configurations to accommodate the features contemplated herein, and may be formed of any suitable material, such as plastic or metal material. The contemplated bolts, which may be standard off-the-shelf items or custom formed, may also be fabricated from any of a variety of suitable materials such as plastic or metal. Further, any suitable connector or connecting system may be implemented. Any suitable number of connectors may be used.

Figure 2A:
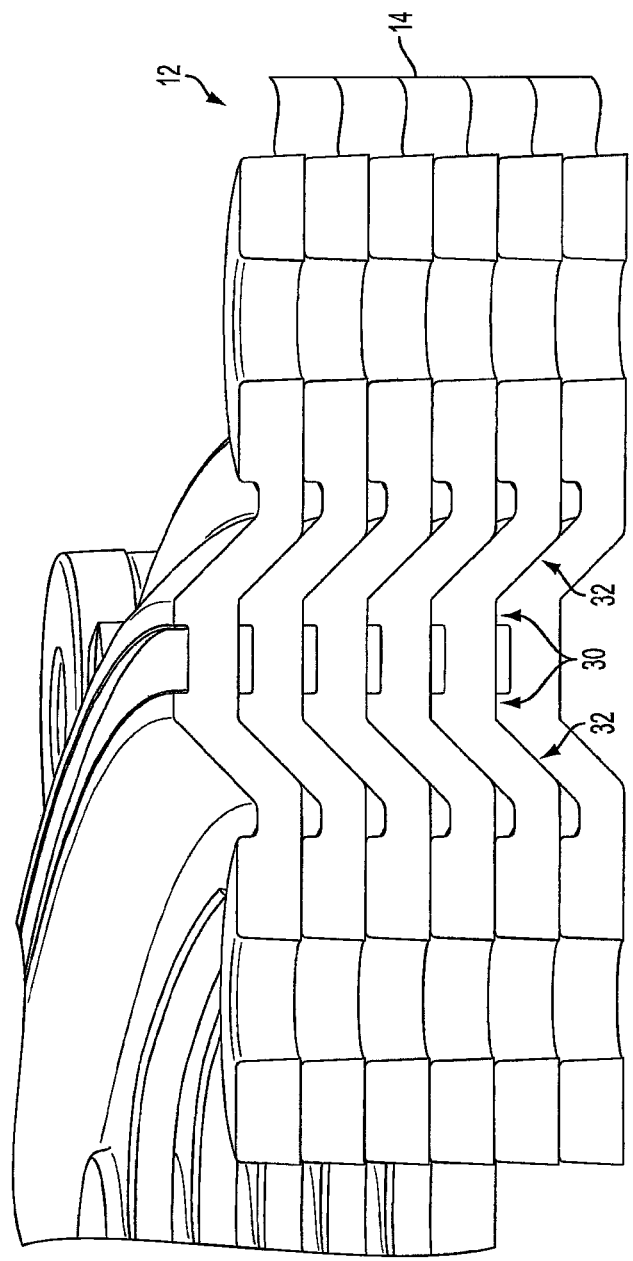
FIGS. 2(a) and (b) are cross-sectional views of several layers of the hydrodynamic separation unit of FIG. 1.

With reference now to FIG. 2(*a*), the layers 14 of the stack 12 of the unit 10 are shown in cross section. Each individual layer 14 is sealed by a compression of two surfaces. The primary seal is parallel to a plane of primary separation diameter and the sidewalls act as a secondary seal surface. In this regard, the layer 14 has a surface lip 30 acting as the primary seal and a draft portion 32 serving as the secondary seal surface. The lip 30 and draft portion 32 provide a contact area for the contemplated sealing and suitably contact and seal with the underside of the layer above, as shown. In at least one form, the surface lip 30 and draft portion 32 are highly polished as a result of the molding process (or otherwise). This results in low surface roughness, which is conducive to improved sealing of the layers 14 to one another when compressed.

In another method of sealing the surfaces between each layer 14, the entire part after being produced is coated through a process such as vapor deposition or electroless plating. The plating material is either naturally softer than the polymer or impregnated with a polymer that gives it a softer surface than the polymer.

With reference now to FIG. 2(*b*), in another method of sealing the surfaces between each layer 14, a sealing material (or structure or device) is placed between the layers to provide sealing. As shown, sealing materials (structures or devices) 34 and 36 are suitably positioned to provide or enhance the sealing function between the layers. In one form, a soft material such as a gasket material or any appropriate rubber material similar to the materials used in the construction of o-rings and other sealing devices may be used to form the elements 34 and 36. Also, a thin polymer material is used, in one form, to provide sealing. It should also be appreciated that the configuration of the sealing material 34 and 36 may vary but, in one form, will take on a shape to conform to the lip 30 and draft portion 32 suitably extending around the layer to provide meaningful sealing function.

In another method of sealing, the surfaces are bonded together through a process of heat sealing or sonic welding as appropriate to the construction material of choice. Using such a technique may result in a change in the appearance of the lip and draft portion to resemble a structure, such as that show in FIG. 2(*b*), or merely create bonding of the appropriate surfaces and resemble the configuration of FIG. 2(*a*).

Referring now to FIG. 3, a single layer 14 is depicted. The layer 14 includes a flow channel 40 having a defined width and depth (depending on the implementation) terminating at inlet 42 and outlets 44 and 46. As shown, the primary sealing surfaces or lips 30 and the secondary sealing surfaces 32 follow the contour of the flow channel 40 around the layer 14 and provide suitable sealing (for example, as described) to the flow channel during operation. During such operation, in one form, fluid flows into the flow channel 40 through the inlet 42 and, through action of various hydrodynamic forces acting on the fluid flow, particles separate into flow paths that selectively exit the flow channel 40 through outlets 44 and 46.

Figure 4:
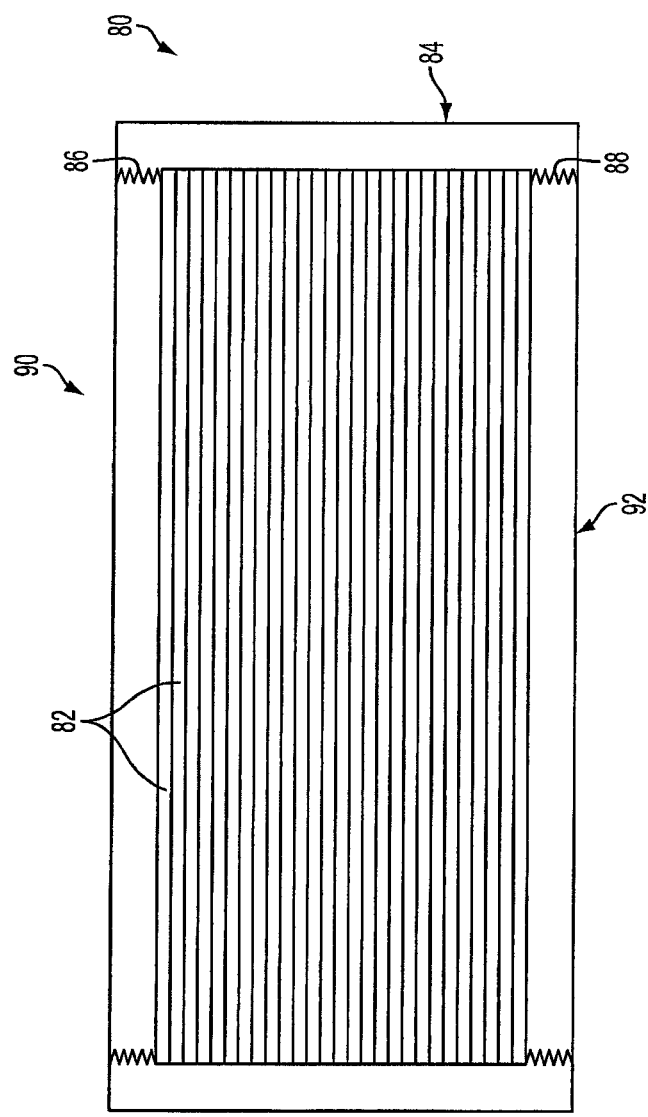

In this regard, as examples, techniques using a variety of forces such as centrifugal forces, pressure-driven forces, Dean Vortices forces, buoyancy forces, etc. may be used to separate particles in the separation devices described herein (such as those described in FIGS. 1 and 4, for example). In this regard, for example, corresponding and commonly assigned patent applications that describe various techniques for particle separation include: U.S. application Ser. No. 11/606,460 filed on Nov. 30, 2006 and entitled PARTICLE SEPARATION AND CONCENTRATION SYSTEM; U.S. application Ser. No. 12/120,093 filed on May 13, 2008 and entitled FLUIDIC STRUCTURES FOR MEMBRANE-LESS PARTICLE SEPARATION; and U.S. application Ser. No. 11/936,729 filed on Nov. 7, 2007 and entitled FLUIDIC DEVICE AND METHOD FOR SEPARATION OF NEUTRALLY BOUYANT PARTICLES, all of which are incorporated herein by reference.

In one form, the inlet and both outlets are located in close proximity to one another. The inlets and outlets could be located at any point along the diameter of the channel depending on the application. It should also be appreciated that in at least one form, the individual layers 14 that are stacked, aligned and sealed (as in FIGS. 1 and 4, for example) form common inlet paths and outlet paths for and/or through the system by way of the alignment of the respective inlets 42 and outlets 44 and 46 of the layers. In at least one form, these common inlets and outlets may be capped and/or connected to other devices or systems through appropriate connections, hoses, pipes, lines, valves, plumbing, hardware, pumps, fittings, caps, etc. . . . , as may be appropriate for any given implementation. In at least some forms, the common inlets and outlets facilitate parallel processing of material that is input to the system. Such parallel processing provides advantages such as higher throughput.

The single layer 14 is also shown to have apertures or through holes 48 and snap fit protrusions 50 in select locations along the edge or periphery of the layer. The through holes 48 receive the bolts shown in FIG. 1. The snap fit protrusions 50 have a configuration allowing for the connection of adjacent layers to one another. The precise configuration and number of the protrusions 50 may vary, as those of skill in the art will appreciate. However, in at least one form, the protrusions 50 are designed to be received in the underside of a corresponding protrusion of an adjacent layer, and snap in place. In this regard, shoulders 52 are provided to the protrusions. Each protrusion is likewise designed to receive a corresponding protrusion of an adjacent layer in like manner. In this way, layers are snap fit together to provide rough alignment and pressed together with the plates to form the seal around the highly polished areas. The protrusions serve to not only locate the layer in their plane, but also to correct for any deviations in flatness of the layer. In at least one form, the layers are snapped together first and then compressed.

FIG. 4 shows a variation (in cross-section) of the presently described embodiments. A hydrodynamic separation unit 80 includes a plurality of separation layers 82 housed in an outer shell 84. The shell 84 has threaded portions 86 and 88 to threadingly receive top plate 90 and bottom plate 92. The layers 82 may take a variety of configurations, but will take the same configuration as layers 14 described in connection with FIGS. 1 through 3, in one form. Of course, the through holes of layer 14 are not necessary for this embodiment, so the layer 82 may be substantially similar to the layer 14, sans the through holes. The plates 90 and 92 have corresponding threaded portions on their edges to mate with the threaded portions 86 and 88. The shell 84 is, in one form, cylindrical to allow for the turning and threading of the plates 90 and 92 into the threaded portions 86 and 88 of the shell 84. Such threading of the plates into the shell provides for compression of the layers 82 between the plates 90 and 92. Of course, to accomplish the contemplated compression, the size of the threaded portions 86 and 88 is suitably tuned to the number of layers 82 or height of any stack of such layers.

The hydrodynamic separation device or unit contemplated by the presently described embodiments may be assembled in any of a variety of manners to facilitate the features achieved by the presently described embodiments. One approach, however, is implemented in a method comprising aligning the protrusions of adjacent layers with one another, snapping together the layers into the stack such that protrusions of adjacent layers are mated and compressing the layers between two plates. The aligning and snapping not only align the layers in the appropriate orientation, but also help correct any undesired bends, curves or warps of the layer that may otherwise prevent an efficient seating and sealing of adjacent layers. Also, in one example, the aligning and snapping are performed before the compressing. In this technique, the compressing may be accomplished in a variety of manners. In one example, consistent with the embodiments shown in FIGS. 1-3, the compressing comprises using bolts received in aligned apertures of the layers of the stack and the plates. In another example, consistent with the embodiment shown in FIG. 4, the compressing comprises threading the plates into a cylindrical shell housing the stack.

Also, as those of skill in the art will appreciate, the snapping is accomplished by shoulders disposed on the protrusions extending from each layer. Still further, in other examples, the method may also include placement or positioning of a suitable sealing material (or structure or device), such as those described herein, between the layers to provide or enhance sealing functions.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A hydrodynamic separation device comprising:
a plurality of layers in a stack, each layer having defined therein a flow channel, the defined flow channel terminating at an inlet to the flow channel and at least two outlets for the flow channel and being configured such that fluid flows into the inlet and, through action of hydrodynamic forces acting on the fluid flow, particles separate into flow paths that selectively exit through the outlets, and apertures defined in the layer, each layer having a primary sealing portion and a secondary sealing portion following a contour of the flow channel around the layer to provide sealing to the flow channel during operation and each layer having protrusions extending therefrom configured to locate the layer in a plane and snap-fit the layer to other layers;
a first plate positioned on a first end of the stack, the first plate having apertures;
a second plate positioned on a second end of the stack, the second plate having apertures; and,
connectors received in aligned apertures of the stack, the first plate and the second plate to compress together the first plate, stack and second plate.

2. The device as set forth in claim 1 wherein the protrusions correct deviations in flatness of the layer in the stack.

3. The device as set forth in claim 1 wherein the protrusions have shoulders disposed thereon.

4. The device as set forth in claim 1 wherein the portion following the contour of the flow channel is a highly polished sealing surface.

5. The device as set forth in claim 1 wherein the primary sealing portion is a lip portion and the secondary sealing portion is a draft portion.

6. The device set forth in claim 1 wherein each layer further includes a soft material positioned to enhance or provide sealing between the layers.

7. The device set forth in claim 1 wherein each layer is coated with a soft polymer layer.

8. The device as set forth in claim 1 wherein each layer of the stack is formed of a plastic material.

9. The device as set forth in claim 1 wherein each layer is formed of a metal material.

10. The device as set forth in claim 1 wherein the first plate and the second plate are formed of metal or plastic material.

* * * * *